April 3, 1928.
H. S. WOODWARD
SIFTER
Filed Aug. 2, 1924    3 Sheets-Sheet 1
1,664,841
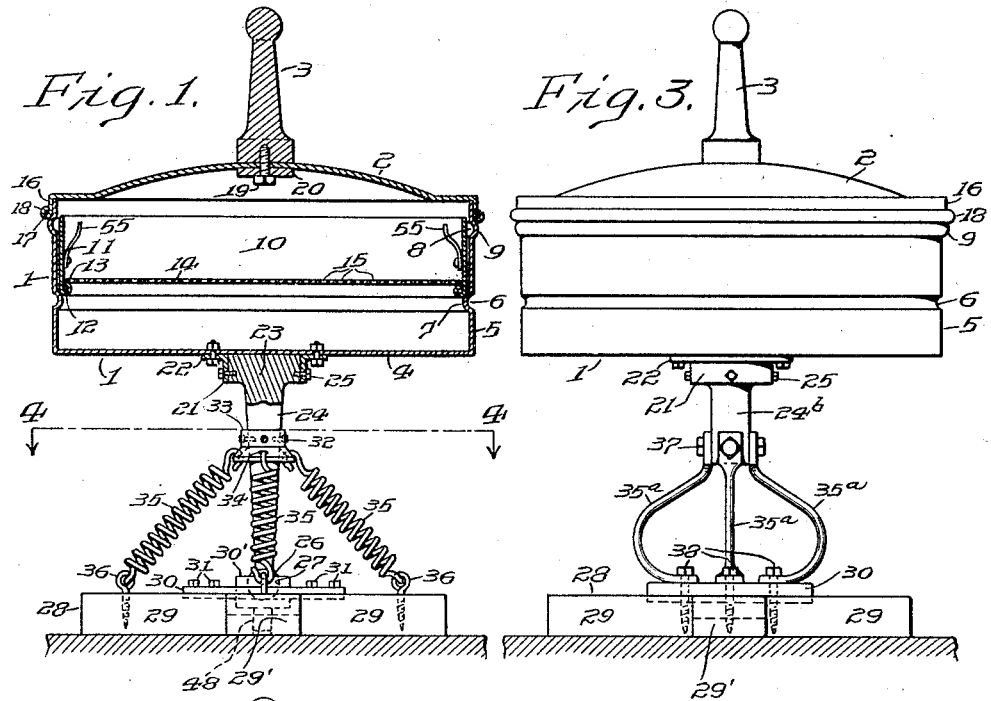
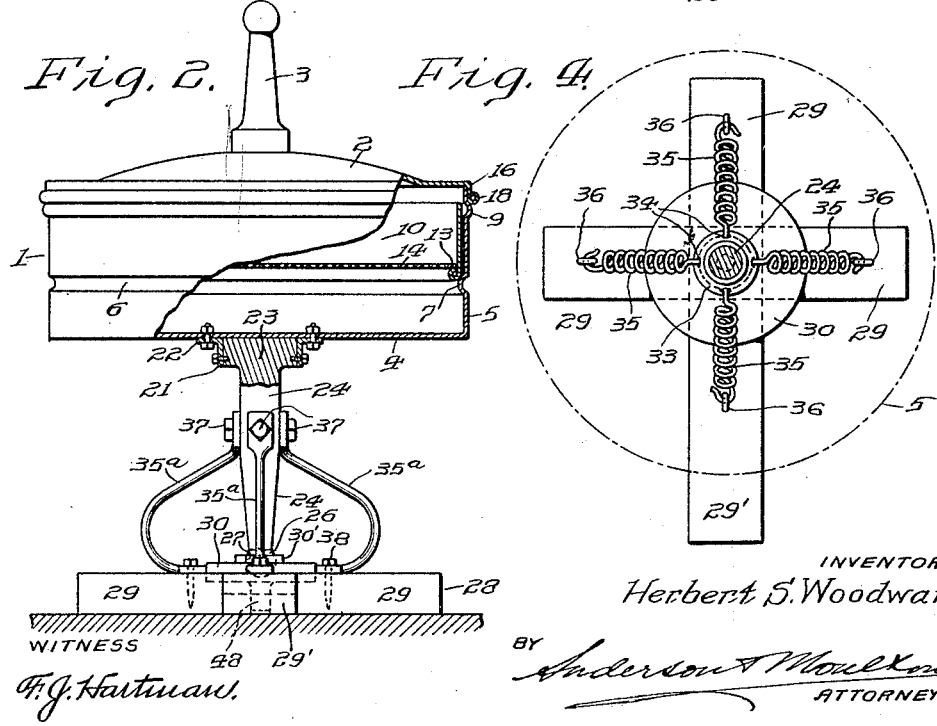
INVENTOR
Herbert S. Woodward
BY
Anderson & Moulton
ATTORNEYS April 3, 1928.

H. S. WOODWARD

SIFTER

Filed Aug. 2, 1924

INVENTOR

Herbert S. Woodward.

BY

Anderson & Moulton

ATTORNEYS

WITNESS

F. J. Hartman.

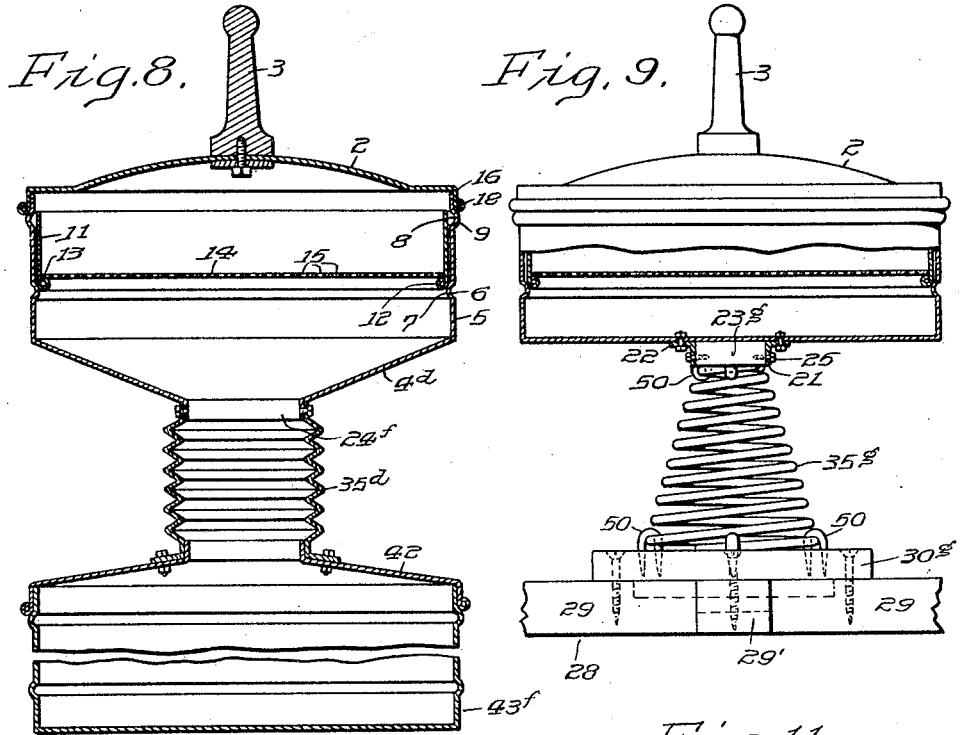
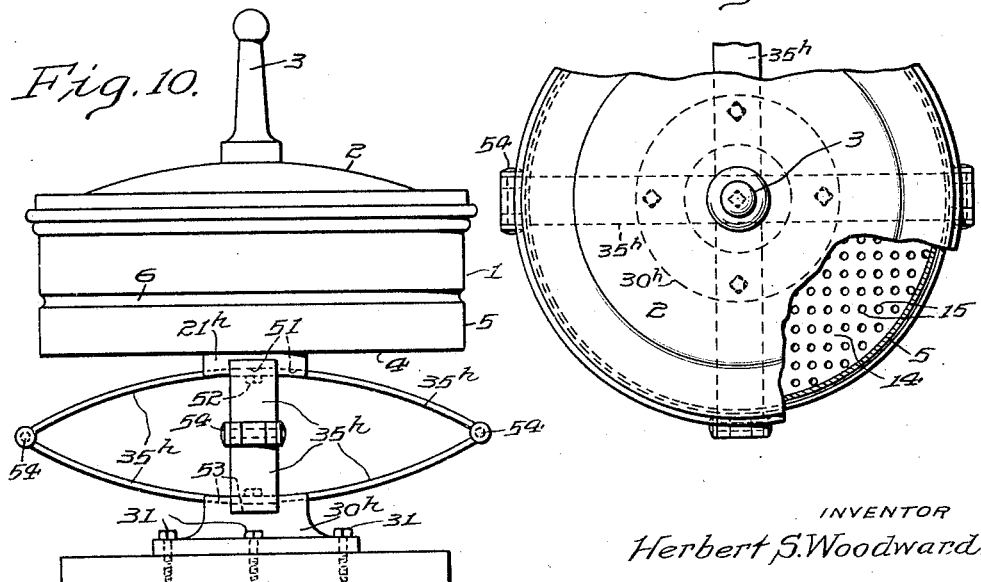

Patented Apr. 3, 1928.

1,664,841

UNITED STATES PATENT OFFICE.

HERBERT S. WOODWARD, OF CARBONDALE, PENNSYLVANIA.

SIFTER.

Application filed August 2, 1924. Serial No. 729,706.

My invention relates to sifters, and more particularly to those devices designed primarily for domestic or household use for screening ashes to reclaim unburned coal therefrom.

The objects of my invention are to provide a sifter, the casing of which is preferably of sheet metal and mounted so as to be capable of universal movement so that the ashes may be thoroughly screened in a very short time.

A further object of my invention is to provide an ash sifter wherein the contents thereof may be given a shaking movement in substantially any direction about a pivotal point in effecting a screening thereof.

A further object of my invention is to provide a sifter wherein the parts may be constructed of comparatively light sheet metal but of such shapes and bearing such relations to each other that the various parts stiffen and strengthen each other to provide a relatively rigid though light-weight device.

Further objects of my invention are to make a device of the character above described in which the sieve is readily removable from the outer casing and the screen is also removable from the sieve so that screens of different mesh may be readily employed when coal of different sizes has been used in the furnace, or an old or worn out screen may be replaced with a new one without disarranging the relation of the other parts of the device.

A further object of my invention is to provide a sifter in which the separable parts fit firmly together and stiffen the whole device.

A further object of my invention is to so construct and arrange a sifter that the provision in the casing for seating the sieve therein stiffens the casing; the provision for seating the cover in the casing stiffens the casing; and the provision in the sieve for seating the screen stiffens the sieve.

A further object of my invention is to provide a cover which, though light, is strong and rigid and forms a support for a handle by which the whole device may be vibrated or shaken to separate the fine ash from the unburned coal and clinkers.

Further objects of my invention will appear in the specification and claims below.

Referring now to the drawings forming a part of this specification,

Fig. 1 is a vertical sectional view of one form or embodiment of my invention.

Fig. 2 is a side elevational view of a modified form thereof.

Fig. 3 is a vertical sectional view of a further modification of my invention.

Fig. 4 is a plan view of the support shown in Figs. 2 and 3.

Fig. 5 shows a side elevational view partly in section of another form of my invention.

Fig. 6 is a side elevational view partly in section of a modified form wherein the post on which the main casing is supported is hollow.

Fig. 7 is a side elevational view of a form of the device wherein the sifted ashes fall below the main or body portion of the sifter to the floor and the dust is prevented from mingling with the atmosphere by a curtain or tube of fabric depending to the floor from the lower edge of the sifter proper.

Fig. 8 is a vertical sectional view of another form of my invention adapted to be mounted on the top of a barrel or ash can.

Fig. 9 is a vertical sectional view of a further modification of my invention.

Fig. 10 shows a different arrangement of springs from that shown in any previous figure; and Fig. 11 is a plan view of Fig. 10, a part of the cover being broken away to show the screen mounted in the sieve.

In the embodiments of my invention shown in Figs. 1, 2, 3, 4, 5, 9 and 10, the main casing 1 is closed on all sides except at the top, and the top is adapted to be closed when the device is in use by a cover 2, snugly fitting and closing the top so as to prevent the escape of dust to the atmosphere. Preferably to the top of the cover 2 is rigidly secured a handle 3 by means of which the casing may be manually shaken.

In said figures, the main casing is shown as cylindrical and of relatively thin sheet metal, and above the bottom wall 4 of the main casing the outer surface of the cylindrical wall 5 is provided with a groove 6, spun or pressed inwardly in the sheet metal to form a ridge 7 in the inner wall thereof spaced well above the bottom wall 4.

Near the top of the cylindrical wall 5 on the inner side thereof is formed a groove 8 by a spinning or pressing operation, which forms a ridge 9 on the outer surface thereof comparatively close to the top edge of the cylindrical wall 5. Within the main casing 1 and seated upon the ridge 7 is a sieve 10, the vertical wall 11 of which is preferably cylindrical and smoothly fits into or within the inner surface of the main casing 1 and the lower edge of the vertical wall 11 of the sieve is preferably coiled or bent around a wire 12 to form a seat 13 upon which a screen 14, preferably of perforated sheet metal is mounted.

This screen 14 is preferably a disk of sheet metal having suitably sized perforations 15 therethrough and which is preferably slightly smaller than the inner diameter of the sieve above the coiled or curved or wired lower edge thereof so that the margin of the disk will rest upon the shoulder or seat 13 at the bottom of the sieve.

The cover 2 of the sifter is preferably provided with a cylindrical flange 16, the lower edge of which is preferably coiled around a wire 17 to stiffen and strengthen the same, and this coiled margin or edge 18 is adapted to snugly fit against the upper surface of the ridge 9 near the top of the main casing 1 to form a substantial dust-proof joint when the cover 2 is seated on the top of the casing 1.

The center of the cover 2 is preferably convex or spherical to provide strength and rigidity to the cover and at the center of the cover a handle 3 is rigidly secured, as by a bolt or screw 19, between the head of which and the inside of the cover is interposed a washer 20. Between the washer 20 and the lower end of the handle 3 the sheet metal of the cover is firmly clamped.

The unit comprising the main casing, the cover and sieve therein may be appropriately termed the screening device, which may be supported in a variety of ways for vibration. Thus, in Figs. 1, 2, 3 and 9, a short cylindrical tube 21 having a radial flange at the upper end thereof may be bolted or otherwise rigidly secured by its flange 22 to the center of the bottom wall 4 of the main casing 1.

In Fig. 1 the head 23 of a post or column 24 fits within the short tube 21 and may be rigidly secured thereto by bolts or screws 25. The lower end of the post or column 34 is preferably provided with a ball or spherical surface 26 adapted to be seated in a smaller spherical recess 27 on the base 28. The base 28 is preferably made in the form of a cross, the radial arms 29 of which are secured to a disk 30 of metal or hard wood in the central boss 30' of which the spherical recess 27 is formed, the arms being secured to the disk 30 by bolts or screws 31. The disk 30 may be provided with a stem 48 fitting into a suitable opening in the base 28. One of the radial arms 29' may be longer than the others so that in shaking the sifter the operator may stand upon it if necessary to hold the base firmly to the floor. However, the weight of the sifter, particularly when filled with ashes to be screened, is usually sufficient to hold the base firmly in contact with the floor and it will not be tilted in shaking the sifter.

Suitably located on the column or post 24 and rigidly secured thereto by a bolt or set screw 32 is a ring 33 provided with openings or holes 34 in the lower edge or flange thereof into each of which may be hooked one end of a coil spring 35, the other end of which may be hooked in the screw eyes 36 secured to the radial arms 29, 29'. These screw eyes 36 provide a means for adjusting the tension of the springs which are preferably four in number and the tension of which should be such as to normally hold the column or post 24 perpendicular even when the sieve 10 is filled with ashes to be screened.

In the form of my invention shown in Fig. 2, the main casing, cover, the handle and the sieve with the screen therein and the short tube 21 providing a socket for the column 24, having at its lower end the ball 26 seated in a recess 27 of the base 28, are all like those parts above described in connection with Fig. 1. The springs 35, of Fig. 1, are replaced by reversely curved springs 35$^a$, the upper ends of which are attached by bolts 37 to the column 24 and the lower ends of which are connected by bolts 38 with the base 28.

The construction shown in Fig. 3 is exactly like that shown in Fig. 2 except that the post 24$^b$ is a short one and extends for only a short distance below the bolts 37, the ball 26 and the recess 27 being omitted. This mounting permits the sifter to be moved in all the directions that the sifters shown in Figs. 1 and 2 may move but the resiliency of the springs permits a slight vertical movement of the sifter in addition thereto.

In the modification shown in Fig. 5 the main casing 1, cover 2, handle 3 and sieve 4 with the screen 14 supported therein are preferably like the constructions previously described. The base 28$^c$, however, is shown as a circular disk of wood or suitable material having a disk 30$^c$ secured by bolts or screws 31$^c$ to the base. The column or post 24$^c$ has a flange 23$^c$ attached by bolts or screws 39 to the bottom wall 4 of the main casing 1. The end of the column 24$^c$ is provided with a ball 26 seated in a spherical recess 27 of the disk 30$^c$.

Also secured to the disk 30$^c$ by the said bolts 39 are four radially extending arms 29$^c$ having upwardly turned ends to each of which are attached, as by a nut 40, one end of a coil spring 35$^c$, the other end of said springs passing through the lower part of the casing 1 and having nuts 41 threaded on the ends thereof inside of the casing 1. The stem 48$^c$ may be extended to form a pin to be embedded in a cement floor.

In Fig. 6 the outer or main casing 1$^d$ is provided with a conical bottom 4$^d$ terminating in a hollow post or column 24$^d$ to the lower end of which is secured by bolts 37$^d$ a hollow sheet metal spring 35$^d$ of the "sylphon" type, the lower end of this spring 35$^d$ being secured by bolts 38$^d$ to the top of a cover 42 of an ash pan 43. This accordion pleated sheet metal spring 35$^d$ permits the main casing 1$^d$ supported thereby to be moved radially from the perpendicular in any direction or any gyratory movement or vertically at the will of the operator, the long hollow post or column 24$^d$ permits the use of a relatively shallow pan resting on the floor and the handle 3 will be or may be made to be at any desired level for convenient manipulation.

Fig. 7 shows a construction somewhat like that shown in Fig. 6 in that the ashes separated from the coal are allowed to pass out of the ash receiver at the bottom of the main casing and that the main casing is resiliently mounted upon a helical spring and is movable in any direction laterally or up and down. The casing 1$^e$ is provided with a downwardly tapering conical bottom 4$^e$ and this bottom 4$^e$ is provided with an opening 44 which communicates or registers with the passage through a short tube 21$^e$ secured by bolts passing through a flange 22$^e$ of said tube. The upper portion of a coil spring 35$^e$ is attached by suitable clamps 45 to the tube 21$^e$. The base 28$^e$ may consist of a disk 30$^e$ to which the lower coil of the spring 35$^e$ is attached by clamps 45. The under side of the disk 30$^e$ is preferably provided with a base 46 in which is a socket 47 into the upper end of which a pin or stake 48$^e$ fits. The stake 48$^e$ may be seated in the recess 47 of the boss 46 and the disk 30$^e$ may be hammered to drive the stake 48$^e$ down into the earth until the upper end of the disk 30$^e$ rests upon the ground. This will afford a rigid support for the sifter when it may be mounted on the earth. To prevent the ashes which fall through the opening 44 to the ground from filling the atmosphere with dust around the sifter, a tubular curtain 49 may be attached to the lower part of the vertical wall of the main casing 1$^d$, 1$^e$ in any suitable manner, the lower end resting on the ground. In this arrangement, the sifter is capable of movement in any direction.

In Fig. 8 is shown a construction somewhat like that of Fig. 6 except that the sylphon 35$^d$ connects the lower part of the conical bottom 4$^d$ with a cover 42 of an ash barrel or can 43$^f$. When this device is mounted on a relatively high barrel 43$^f$ the long hollow column 24$^d$ of Fig. 6 may be replaced with a short tube 24$^f$ to which the upper end of the sylphon 35$^d$ is attached. The height of the barrel will bring the handle to the proper level to enable one to shake the sifter with facility.

Fig. 9 differs mainly from the construction shown in Fig. 3 in the spring mounting for the sifter body. This spring 35$^g$ is a conical coiled spring and the upper end thereof is attached by staples 50 to a wooden head 23$^g$ secured in the short tube 21 on the bottom 4 of the main casing and the lower coil of the spring is also secured by staples 50 to the top of the circular disk or block 30$^g$ of the base 28$^h$.

In Figs. 10 and 11 are shown modified forms wherein four semi-elliptical springs 35$^h$ support the sifter proper. In this construction the bottom 4 of the main casing 1 is provided with a block 21$^h$, having grooves 51 disposed at right angles to each other and into each of which fits one of the semi-elliptical springs 35$^h$. The springs may be secured to the block 21$^h$ by a bolt 52. The base 28$^h$ may be provided with a block 30$^h$ which also is provided in the top thereof with a pair of grooves 53 at right angles to each other and one below the plane of the other into which may fit two more semi-elliptical springs 35$^h$. Each pair of springs are secured to each other by pins 54 somewhat in the manner of a hinge joint. In this embodiment of my invention the main casing 1, the cover 2, the handle 3 and the sieve 10, fitted into the casing 1, are preferably constructed as shown in Fig. 1.

Referring now to Figs. 1, 2, 3, 4 and 5, to sift ashes, the lid or cover 2 is lifted and the ashes to be sifted are placed in the sieve 10. The cover is then replaced and the operator grasping the handle 3 shakes the sifter in any direction radially of the axis of the column 24 when it is in its normal position, or may impart to the sifter a circular or gyratory movement all against the tension of the springs, tending to restore the device to a perpendicular position. In these embodiments of my invention the main casing will be pivotally moved around the universal joint at the bottom of the column provided by the ball 26 and the recess 27. No dust may escape from the casing because it is closed on all sides except the top and the lid is tightly fitted to the top of the casing. The coiled margin 18 of the lid fits snugly against the ridge 9 of the casing and completely closes it. Moreover, because of the stiff rim of the lid or cover and the spherical shape of the top of the cover, the cover is strong enough to transmit the force imparted by the operator through the handle to the entire casing without bending or flexing it. Although the main casing 1 is made of comparatively thin sheet material, the cylindrical form thereof, together with the stiffening ribs or ridges 7 and 9 and the comparatively stiff cylindrical sieve fitted therein and the cover tightly fitting over the top thereof produces a very strong but light receptacle which may be readily shaken back and forth in any direction in a substantially horizontal plane to sift the ashes or other material placed therein with great facility.

In Figs. 6, 7, 8, 9 and 10, the pivotal column, such as is shown at 24 in Fig. 1, is dispensed with and a spring is employed to support the main casing and to furnish the resiliency tending to restore the device to a perpendicular position. The spring or sylphon 35$^a$ of the modification shown in Figs. 6 and 8 may afford a slight vertical movement to the sifter but in the main, it substantially forms a pivotal bearing about which the main casing may be oscillated in any direction substantially horizontally.

In Figs. 7 and 9, the sifter casing is mounted and supported by a spiral spring instead of on a sylphon or hollow spring closed on all sides and in these modifications the sifter casing may be oscillated in any direction horizontally or at right angles to the normal axis of the spring but it may also be given an up-and-down shaking movement in addition thereto.

In Figs. 10 and 11 the construction differs from that shown in Fig. 9 mainly in the substitution of elliptical springs for spiral springs and in this form the main casing 1 may be moved transversely or vertically. It is, however, generally speaking easier to move the container transversely than it is vertically and the transverse motion probably more readily frees the mass to be sifted of the fine material which will pass through the perforations of the sieve than the up-and-down and vertical movement.

In the form of the device shown in Fig. 6, the post is hollow in order to bring the handle 3 to an elevation where it can be readily grasped and manipulated by an operator standing opposite the device. It is particularly adapted for use in connection with a shallow ash pan. In Fig. 8, however, the long hollow post 24$^d$ may be substantially omitted because the head of the barrel will bring the handle to the desired elevation.

The base 28, when made in the manner shown in Fig. 4, need not be fastened to the floor. The weight of the material in the sifter will be sufficient to hold the arms 29, 29' squarely on the floor and particularly when the arm 29' is long enough to permit the operator to stand upon it in shaking the main casing. When, however, it is desirable to do so, it may be screwed or otherwise fastened to the floor. It may be mounted on a plate such as 30$^e$ provided with a stake which may be driven in the ground as shown in Fig. 7. In Fig. 5 the base 28 is shown as a small plate and the disk 30$^c$ may be provided with a post 48$^c$ which may be cemented in a hole in a cement foundation or floor.

In those forms of my device wherein the ash collects in the bottom of the casing, it will become necessary from time to time to remove the sieve 10 to empty the ashes which may collect in the casing 1, and to do this, the sieve 10 will have to be removed. To facilitate the removal of the sieve, it may be provided with handles 55 on the inside thereof.

In Figs. 3 and 4 the springs 35$^a$ are preferably substantially circular in cross-section so that the resistance to motion in any substantial horizontal direction will be substantially the same.

In some instances, however, I may make the tension of these springs, and of the springs shown in Figs. 1, 4 and 5, of different tensions or different degrees of stiffness so that the sifter may be shaken back and forth in one direction a little easier than it is in a direction at right angles thereto. This permits of the imparting to the shaker of a comparatively slow back and forth motion and a quick or jerky lateral motion simultaneously therewith which produces a very thorough agitation and shaking of the contents of the sieve.

Having thus described my invention, what I claim and desire to protect by Letters Patent of the United States is:

1. In a sifter, the combination with a universally resilient support, of a screening device rigidly secured to the free end of said support whereby said device may be agitated substantially horizontally in all directions and said device will be returned after agitation to its normal position, due to the resiliency of said support.

2. In a sifter, the combination of a screening device and a support mounted at its lower end for universal movement and normally resiliently maintained substantially perpendicular, said screening device being rigidly secured to and carried by the upper end of said support and being tiltable with the top of said support in all directions.

3. In a sifter, the combination with a screening device, of a support for said device universally pivotally mounted at its lower end and normally resiliently maintained perpendicular, and means to rigidly secure said device to the upper end of said support, said support and the parts carried thereby being manually tiltable in all directions around said pivot of said support as a center.

4. In a sifter, the combination of a screening device, a rigid base and a resilient support, whereon said screening device is rigidly mounted, connecting said screening device with said base and normally holding said screening device vertically over said base, said screening device and the top end of said support being manually movable back and forth in all directions in approximately a horizontal plane.

5. In a sifter, the combination of a screening device and a support to which said screening device is secured, said support being mounted for universal pivotal movement about the lower end thereof as a center, and means to normally resiliently maintain said support perpendicular, whereby said screening device and the top of said support may be manually oscillated and gyrated about the pivot of said support.

6. In a sifter, the combination of a screening device, a post universally pivoted at its lower end, means for rigidly securing said screening device to the upper end of said post, and resilient means normally holding said post perpendicular, whereby said screening device may be oscillated and gyrated about said pivot against the tension of said resilient means.

7. In a sifter, the combination of a post, a stationary base on which the lower end of said post is universally joined, yielding means to normally hold said post substantially perpendicular, and a screening device rigidly mounted on the upper end of said post, whereby said screening device and the upper end of said post are manually freely movable about the lower end of said post as a pivot in all directions substantially horizontally against the tension of said yielding means.

8. In a sifter, the combination of a screening device and a single support therefor, one end of said support being rigidly secured to the bottom of said screening device and the other end of said support being pivotally mounted for universal movement about the pivot of said post as a center, and means to normally yieldingly maintain said post in a position in which the screening device is substantially horizontal, the upper end of said support and the parts carried thereby being manually tiltable in all directions.

In testimony whereof I have hereunto set my hand this first day of August, 1924.

HERBERT S. WOODWARD.